US012080982B2

(12) United States Patent
Fukuyama

(10) Patent No.: US 12,080,982 B2
(45) Date of Patent: Sep. 3, 2024

(54) CONNECTOR WITH PROTECTION WALL

(71) Applicant: SUMITOMO WIRING SYSTEMS, LTD., Mie (JP)

(72) Inventor: Kyoko Fukuyama, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 138 days.

(21) Appl. No.: 17/669,713

(22) Filed: Feb. 11, 2022

(65) Prior Publication Data

US 2022/0271449 A1 Aug. 25, 2022

(30) Foreign Application Priority Data

Feb. 25, 2021 (JP) ................................ 2021-029070

(51) Int. Cl.

| | |
|---|---|
| ***H01R 9/03*** | (2006.01) |
| ***H01R 9/16*** | (2006.01) |
| ***H01R 11/12*** | (2006.01) |
| *H01R 13/52* | (2006.01) |

(52) U.S. Cl.

CPC ................ *H01R 9/03* (2013.01); *H01R 9/16* (2013.01); *H01R 11/12* (2013.01); *H01R 13/5202* (2013.01); *H01R 2201/26* (2013.01)

(58) Field of Classification Search

CPC . H01R 9/03; H01R 9/16; H01R 11/12; H01R 13/5202; H01R 2201/26

See application file for complete search history.

(56) References Cited

U.S. PATENT DOCUMENTS

| | | | | |
|---|---|---|---|---|
| 7,077,676 | B2 * | 7/2006 | Matsumoto | H01R 13/521 439/271 |
| 8,545,265 | B2 * | 10/2013 | Sakamoto | H01R 13/504 439/606 |
| 9,083,107 | B2 * | 7/2015 | Suzuki | H01R 13/5202 |
| 9,208,922 | B2 * | 12/2015 | Yoshida | H01R 13/6596 |
| 9,293,866 | B2 * | 3/2016 | Tanaka | H01R 12/777 |
| 9,362,653 | B2 * | 6/2016 | Tanaka | H01R 13/713 |
| 9,490,564 | B2 * | 11/2016 | Nakayama | H01R 13/41 |
| 9,674,994 | B2 * | 6/2017 | Yoshida | H01B 7/04 |
| 9,774,157 | B2 * | 9/2017 | Patel | H01R 27/02 |
| 10,062,974 | B2 * | 8/2018 | Okamoto | H01R 4/34 |
| 10,290,974 | B2 * | 5/2019 | Ishibashi | B60L 15/007 |
| 10,305,226 | B2 * | 5/2019 | Iida | H01R 13/6593 |
| 10,553,979 | B2 * | 2/2020 | Iida | B60L 3/003 |
| 11,133,615 | B2 * | 9/2021 | Liu | H01R 13/055 |
| 2015/0129305 | A1 | 5/2015 | Yoshida et al. | |

* cited by examiner

*Primary Examiner* — Thanh Tam T Le

(74) *Attorney, Agent, or Firm* — Venjuris, P.C.

(57) ABSTRACT

A connector 10 is provided with a supporting member 11 including an opening open in a first direction D1, a terminal 12 supported by the supporting member 11, and a wire 13 connected to the terminal 12. The terminal 12 extends inwardly of the opening from an inner surface of the opening and extends to outside of the supporting member 11 through the opening. The supporting member 11 includes a pull-out portion 24 from which the wire 13 is pulled out. The wire 13 is pulled out from the pull-out portion 24 away from the opening along a second direction D2 intersecting the first direction D1. The supporting member 12 includes a first protection wall 31 extending along the first direction D1 between a tip part 12*a* of the terminal 12 and the pull-out portion 24.

7 Claims, 5 Drawing Sheets

CONNECTOR WITH PROTECTION WALL

CROSS-REFERENCE TO RELATED APPLICATION

This application is based on and claims priority from Japanese Patent Application No. 2021-029070, filed on Feb. 25, 2021, with the Japan Patent Office, the disclosure of which is incorporated herein in their entireties by reference.

TECHNICAL FIELD

The present disclosure relates to a connector.

BACKGROUND

For example, Japanese Patent Laid-open Publication No. 2015-095357 discloses a vehicle connector. This connector includes a supporting member having an opening, a terminal supported by the supporting member and a wire connected to the terminal. The supporting member has the opening. The terminal extends from the inner surface of the opening of the supporting member and extends to the outside of the supporting member through the opening.

SUMMARY

The connector as described above requires a certain ingenuity to protect the terminal so that the terminal extending from the supporting member does not contact a table, for example, when the connector is placed on the table during an assembling operation.

Accordingly, it is aimed to provide a connector capable of protecting a terminal.

The present disclosure is directed to a connector with a supporting member including an opening open in a first direction, a terminal supported by the supporting member, and a wire connected to the terminal, wherein the terminal extends inwardly of the opening from an inner surface of the opening and extends to outside of the supporting member through the opening, the supporting member includes a pull-out portion, the wire being pulled out from the pull-out portion, the wire is pulled out from the pull-out portion away from the opening along a second direction intersecting the first direction, and the supporting member includes a first protection wall extending along the first direction between a tip part of the terminal and the pull-out portion.

According to the present disclosure, it is possible to provide a connector capable of protecting a terminal.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
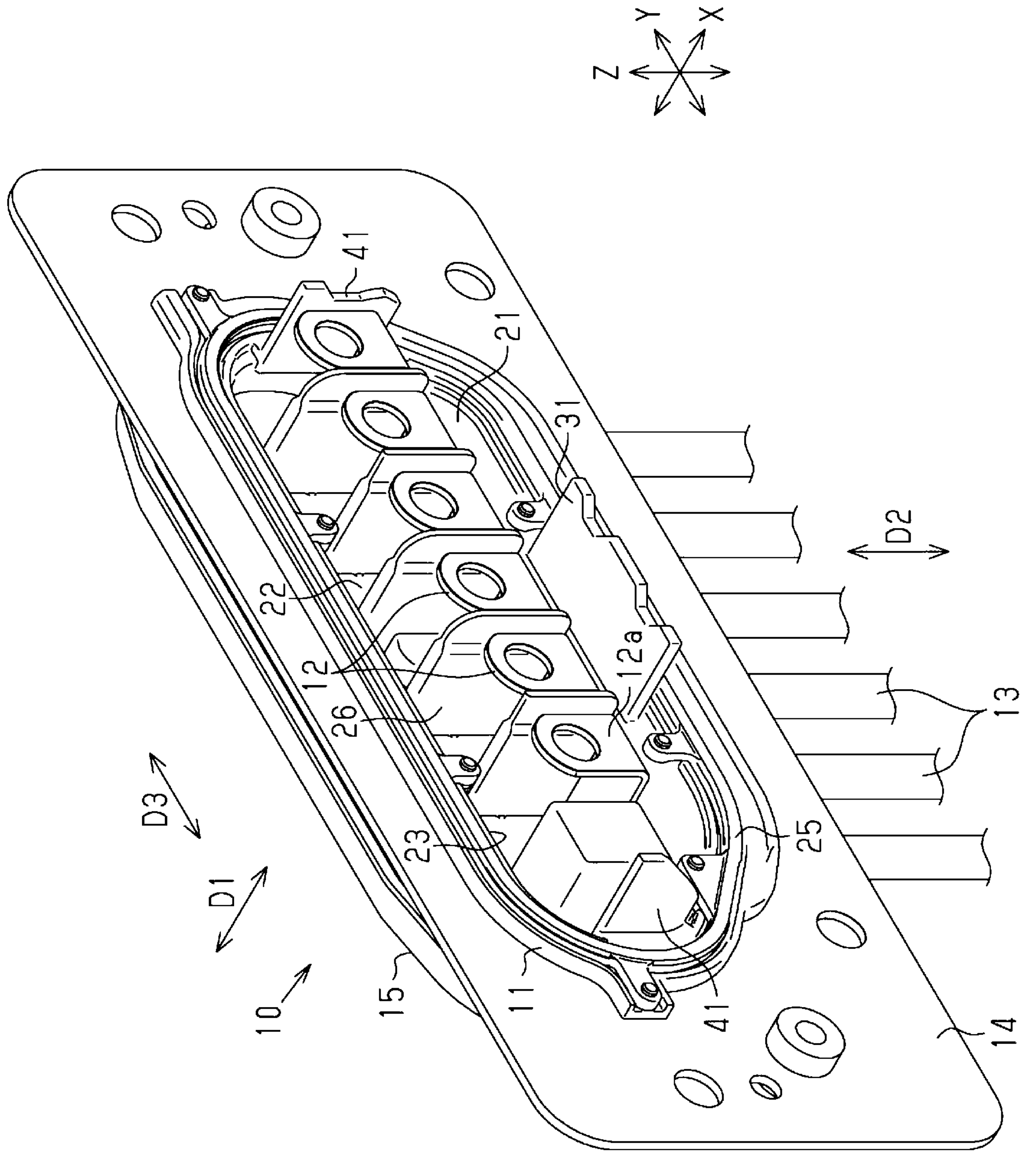
FIG. 1 is a perspective view of a connector in an embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

[1] The connector of the present disclosure is provided with a supporting member including an opening open in a first direction, a terminal supported by the supporting member, and a wire connected to the terminal, wherein the terminal extends inwardly of the opening from an inner surface of the opening and extends to outside of the supporting member through the opening, the supporting member includes a pull-out portion, the wire being pulled out from the pull-out portion, the wire is pulled out from the pull-out portion away from the opening along a second direction intersecting the first direction, and the supporting member includes a first protection wall extending along the first direction between a tip part of the terminal and the pull-out portion.

According to this configuration, for example, when being placed on a table or the like, the connector can be placed while being supported by the first protection wall. Here, the first protection wall is provided between the tip part of the terminal and the pull-out portion for the wire. Further, a center of gravity of the connector can be set on the wire side with respect to the first protection wall due to the weight of the wire. Thus, the terminal can be lifted from the table with the first protection wall as a fulcrum. Therefore, the terminal can be protected by the first protection wall.

[2] A plurality of the terminals are provided side by side in a third direction intersecting each of the first and second directions.

According to this configuration, a dimension of the connector is easily suppressed in the second direction, i.e. a direction of pulling out the wire, while the plurality of terminals are provided. By suppressing the dimension of the connector in the second direction, the center of gravity of the connector is easily set on the wire side when the connector is placed on the table or the like while being supported by the first protection wall. Therefore, the terminal is easily lifted with the first protection wall as a fulcrum, with the result that the terminal can be more suitably protected.

[3] The first protection wall is shaped to extend in the third direction when viewed from the first direction.

According to this configuration, the first protection wall is shaped to extend in an arrangement direction of the terminals. In this way, the size of the first protection wall can be ensured while a space between the opening and the pull-out portion in the supporting member is effectively utilized.

[4] The first protection wall includes a plurality of projections arranged along the third direction on a tip part in the first direction.

According to this configuration, the connector can be stably supported by the first protection wall when being placed on the table or the like.

[5] A range where the first protection wall is provided is smaller in the third direction than a range where the plurality of terminals are provided.

According to this configuration, the plurality of terminals can be protected by the first protection wall while the first protection wall is reduced in size in the third direction.

[6] The supporting member includes a pair of second protection walls respectively extending along the first direction, and the pair of second protection walls are arranged on both sides of the opening in a third direction intersecting each of the first and second directions. According to this configuration, the terminal can be protected also by the pair of second protection walls in addition to the first protection wall. As a result, the terminal can be more reliably protected.

[7] The second protection walls are shaped to extend in the second direction when viewed from the first direction.

According to this configuration, the connector can be reduced in size in the third direction as compared to the case where the second protection walls extend, for example, in the third direction when viewed from the first direction.

[8] A tip of the first protection wall projects more than the tip part of the terminal in the first direction.

According to this configuration, the terminal is easily lifted with the first protection wall as a fulcrum when the connector is placed on the table or the like while being supported by the first protection wall. As a result, the terminal can be more suitably protected.

Details of Embodiment of Present Disclosure

A specific example of a connector of the present disclosure is described below with reference to the drawings. In each figure, some of components may be shown in an exaggerated or simplified manner for the convenience of description. Further, a dimension ratio of each part may be different in each figure. Further, "parallel" and "orthogonal" in this specification mean not only strictly parallel and orthogonal, but also substantially parallel and orthogonal within a range in which functions and effects in the embodiment are achieved. Note that the present invention is not limited to these illustrations and is intended to be represented by claims and include all changes in the scope of claims and in the meaning and scope of equivalents.

Note that "plate-like shapes" in this specification include shapes having corners and ridges chamfered, shapes having corners and ridges rounded and shapes having irregularities or the like on some or all of surfaces constituting the shapes. Further, a term "annular" used in the description of this specification may indicate an arbitrary looped structure or a generally looped structure having an endless continuous shape or having a gap such as a C shape. Note that "annular" shapes include circular shapes, elliptical shapes and polygonal shapes with pointed or rounded corners, but there is no limitation to these.

(Overall Configuration of Connector 10)

As shown in FIG. 1, a connector 10 includes a supporting member 11, terminals 12 supported by the supporting member 11 and wires 13 connected to the terminals 12. Note that XYZ axes orthogonal to each other are shown in the figures.

A fixing plate 14 is, for example, mounted on the supporting member 11. The fixing plate 14 is for fixing the connector 10 to an unillustrated connection partner. The terminals 12 are connected to terminals of the connection partner. Note that the connection partner is, for example, an inverter. One end of the wire 13 is connected to the terminal 12, and the other end thereof is connected to a travel drive motor, for example, in an electric or hybrid vehicle.

(Configuration of Supporting Member 11)

Figure 2:
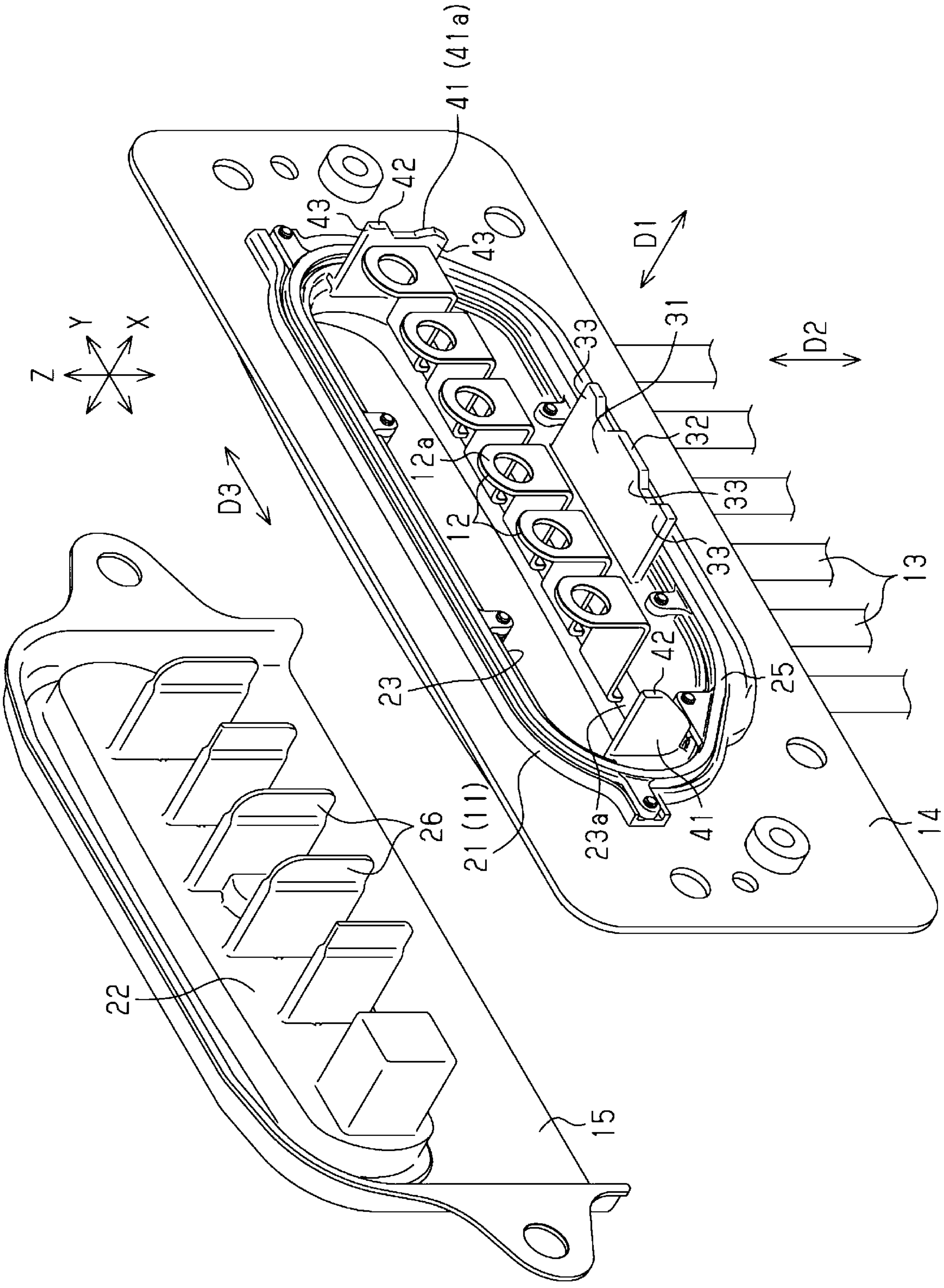
FIG. 2 is an exploded perspective view of the connector in the embodiment.
Figure 3:
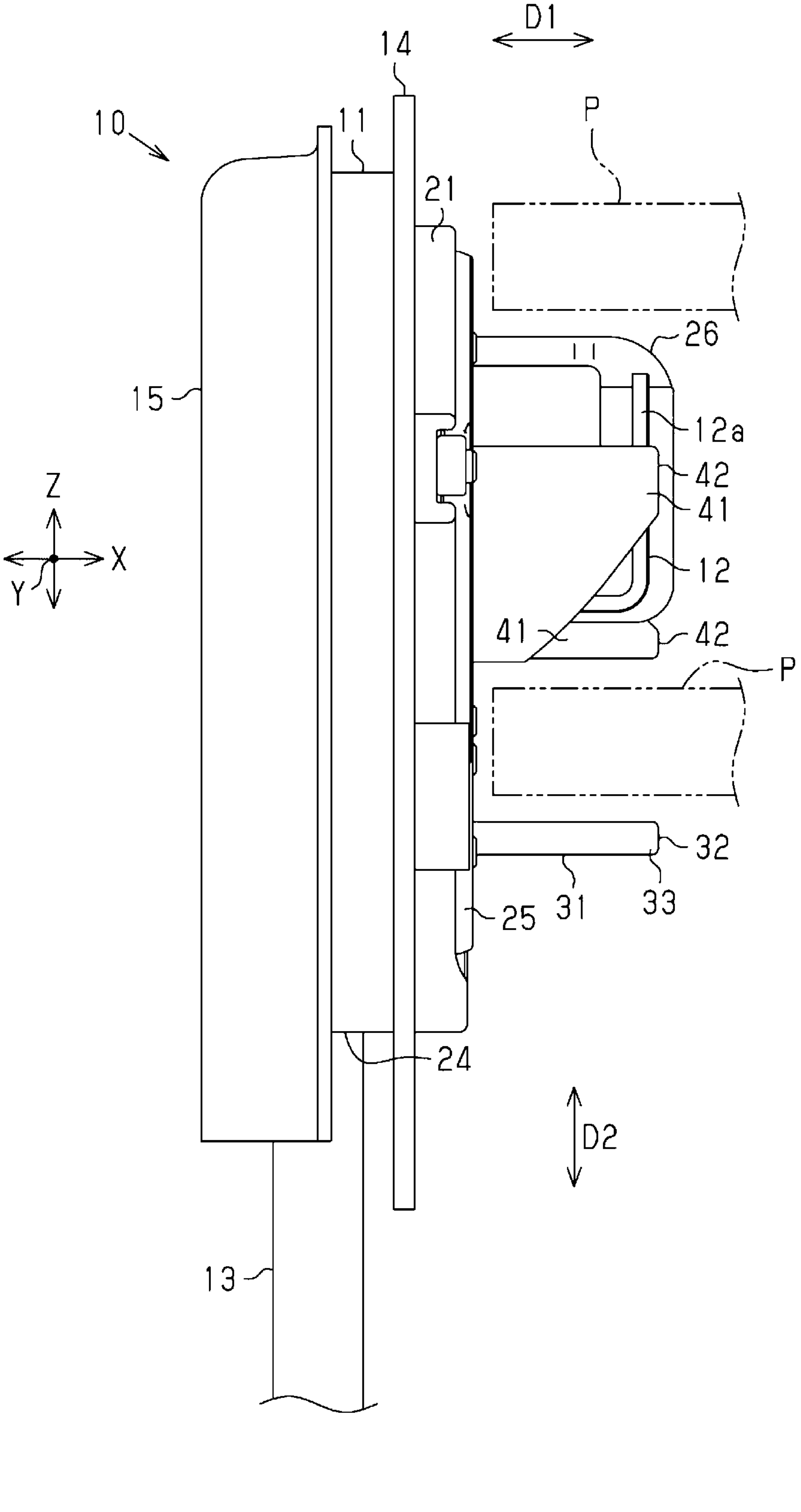
FIG. 3 is a side view of the connector in the embodiment.

As shown in FIGS. 2 and 3, the supporting member 11 includes a body portion 21 and a cover portion 22. The body portion 21 and the cover portion 22 are, for example, made of an insulating material such as a synthetic resin. Note that the connector 10 of this embodiment includes, for example, a metal cover 15 for covering the supporting member 11.

The body portion 21 of the supporting member 11 includes an opening 23 and a pull-out portion 24. The opening 23 is open in a first direction D1 along the X axis. For example, the opening 23 penetrates through the body portion 21 along the first direction D1. The cover portion 22 is assembled with the body portion 21. The cover portion 22 covers one end side of the opening 23 in the first direction D1.

The body portion 21 includes a sealing member 25. The sealing member 25 is provided on an end side facing the connection partner in the opening 23. The sealing member 25 has an annular shape surrounding the opening 23 when viewed from the first direction D1. The sealing member 25 seals the opening 23 in a liquid-tight manner, for example, by contacting a housing of the connection partner.

The wires 13 are pulled out to the outside of the body portion 21 from the pull-out portion 24. Further, the wires 13 are pulled out from the pull-out portion 24 away from the opening 23 along a second direction D2 intersecting the first direction D1. The second direction D2 of this embodiment is, for example, a direction along the Z axis and orthogonal to the first direction D1.

Figure 4:
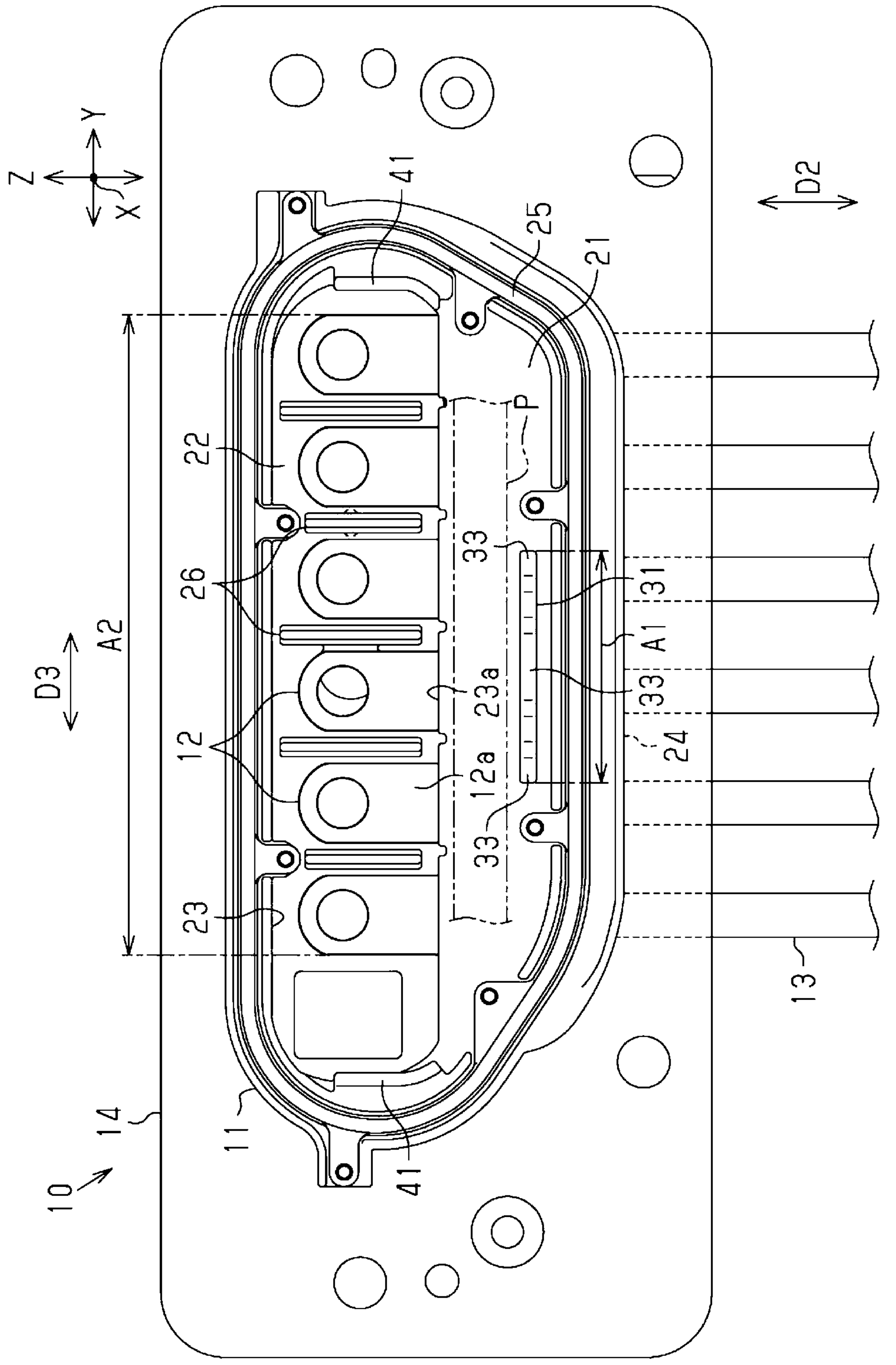
FIG. 4 is a front view of the connector in the embodiment.

As shown in FIGS. 2 and 4, the connector 10 includes, for example, a plurality of the terminals 12. The plurality of terminals 12 are provided side by side in a third direction D3 intersecting each of the first and second directions D1, D2. The third direction D3 of this embodiment is, for example, a direction along the Y axis and orthogonal to each of the first and second directions D1, D2. Further, a plurality of the wires 13 are provided to correspond to the plurality of terminals 12.

The terminal 12 extends inwardly of the opening 23 from the inner surface of the opening 23. Further, the terminal 12 extends, for example, along the first direction D1 from a part located on the inner surface of the opening 23 and extends to the outside of the body portion 21. That is, the terminal 12 includes a tip part 12*a* located outside the body portion 21. The tip part 12*a* of the terminal 12 has, for example, a flat surface shape orthogonal to the first direction D1.

The tip part 12*a* of the terminal 12 is connected to the terminal of the connection partner. For example, the tip part 12*a* is connected to the terminal of the connection partner by an unillustrated bolt or the like. Note that an operation of connecting the tip part 12*a* and the terminal of the connection partner is performed through the opening 23. After the tip parts 12*a* and the terminals of the connection partner are assembled, the cover portion 22 is assembled with the body portion 21 and the opening 23 is closed by the cover portion 22. Further, base end parts of the terminals 12 opposite to the tip parts 12 are, for example, connected to the wires 13 inside the body portion 21.

The supporting member 11 includes, for example, insulating wall portions 26. The insulating wall portions 26 extend, for example, along the first direction D1 from the cover portion 22. The insulating wall portions 26 are respectively arranged between adjacent ones of the plurality of terminals 12. The insulating wall portions 26 insulate between the terminals 12.

(Configuration of First Protection Wall 31)

As shown in FIGS. 2 to 4, the body portion 21 includes a first protection wall 31. The first protection wall 31 is integrally formed to the body portion 21, for example, by injection molding.

FIG. 3 is a side view of the connector 10 viewed from the third direction D3. As shown in FIG. 3, the first protection wall 31 extends, for example, along the first direction D1. Further, a tip part 32 of the first protection wall 31 projects more than the tip parts 12*a* of the terminals 12 in the first direction D1. That is, the tip part 32 of the first protection wall 31 is at a position more away from the opening 23 than the tip parts 12*a* of the terminals 12 in the first direction D1 when viewed from the third direction D3.

FIG. 4 is a front view of the connector 10 viewed from the first direction D1. The first protection wall 31 is provided between the tip parts 12*a* of the terminals 12 and the pull-out portion 24 when viewed from the first direction D1. Further, the first protection wall 31 is provided between the opening 23 and the pull-out portion 24 when viewed from the first direction D1. Further, the first protection wall 31 is, for example, located inside a loop defined by the sealing member 25 when viewed from the first direction D1.

The first protection wall 31 is, for example, shaped to extend in the third direction D3 when viewed from the first direction D1. That is, the first protection wall 31 is shaped to extend in an arrangement direction of the plurality of terminals 12. The first protection wall 31 is, for example, in the form of a flat plate orthogonal to the second direction D2.

A range A1 where the first protection wall 31 is provided is smaller in the third direction D3 than a range A2 where the plurality of terminals 12 are provided. The range A1 is a range from one end to the other end of the first protection wall 31 in the third direction D3. The range A2 is a range from the terminal 12 arranged on one end to the terminal 12 arranged on the other end in the third direction D3.

As shown in FIG. 2, the first protection wall 31 includes a plurality of projections 33 arranged along the third direction D3 on the tip part 32 in the first direction D1. Each projection 33 projects, for example, in an extending direction of the first protection wall 31, i.e. in the first direction D1. For example, three projections 33 are provided. The projections 33 are respectively provided on both end parts and a central part in the third direction D3 on the tip part 32. The tips of the respective projections 33 are located on the same plane orthogonal to the first direction D1.

If the body portion 21 including the first protection wall 31 is, for example, made of synthetic resin, the projections 33 of the first protection wall 31 can serve as a control portion by setting the plurality of projections 33 on the tip part 32 of the first protection wall 31. That is, if the tip part 32 of the first protection wall 31 is designed at a uniform position entirely in the third direction D3, the entire surface of the tip part 32 of the first protection wall 31 serves as a control portion due to characteristics of the synthetic resin. Accordingly, by setting the plurality of projections 33 along the third direction D3 as in this embodiment, only the projections 33 can serve as the control portion in the first protection wall 31. In this way, the dimensional control of the tip part 32 becomes easier. Note that the control portion is a part requiring the dimensional control at the time of resin molding.

(Configuration of Second Protection Walls 41)

As shown in FIGS. 2 and 4, the body portion 21 includes, for example, a pair of second protection walls 41. Each second protection wall 41 is integrally formed to the body portion 21, for example, by injection molding. Each second protection wall 41 extends, for example, along the first direction D1.

Each second protection wall 41 is, for example, in the form of a flat plate orthogonal to the third direction D3. The second protection walls 41 are respectively arranged on both sides of the opening 23 in the third direction D3 when viewed from the first direction D1. The pair of second protection walls 41 are, for example, parallel to each other. Further, the pair of second protection walls 41 are opposite to each other across the opening 23 in the third direction D3.

Note that "opposite" in this specification indicates that surfaces or members are at positions opposite to each other, and means not only that these are at perfectly opposite positions, but also that these are at partly opposite positions. Further, "opposite" in this specification means both a case where another member different from two parts is interposed between the two parts and a case where nothing is interposed between two parts.

As shown in FIG. 3, tip parts 42 of the second protection walls 41 project more than the tip parts 12*a* of the terminals 12 in the first direction D1. That is, the tip parts 42 of the second protection walls 41 are at positions more away from the opening 23 than the tip parts 12*a* of the terminal 12 in the first direction D1 when viewed from the third direction D3.

As shown in FIG. 4, each second protection wall 41 is shaped to extend in the second direction D2 when viewed from the first direction D1. Further, each second protection wall 41 is, for example, located inside the loop defined by the sealing member 25 when viewed from the first direction D1.

As shown in FIG. 2, one of the pair of second protection walls 41 includes a plurality of projections 43 arranged along the second direction D2. Here, the second protection wall 41 including the projections 43 is referred to as the second protection wall 41*a*.

Each projection 43 is provided on the tip part 42 of the second protection wall 41*a* in the first direction D1. Each projection 43 projects, for example, in an extending direction of the second protection wall 41*a*, i.e. in the first direction D1. Two projections 43 are, for example, provided. The projections 43 are respectively provided on both end parts in the second direction D2 on the tip part 42 of the second protection wall 41*a*.

If the body portion 21 including the second protection wall 41*a* is, for example, made of synthetic resin, the projections 43 can serve as a control portion of the second protection wall 41*a* by setting the plurality of projections 43 on the tip part 42 of the second protection wall 41*a*. That is, if the tip part 42 of the second protection wall 41*a* is designed at a uniform position entirely in the second direction D2, the entire surface of the tip part of the second protection wall 41*a* serves as a control portion due to characteristics of the synthetic resin. Accordingly, by setting the plurality of projections 43 along the second direction D2 as in this embodiment, the dimensional control of the tip part 42 of the second protection wall 41*a* becomes easier. Note that the control portion is a part requiring the dimensional control at the time of resin molding.

Functions of this embodiment are described.

Figure 5:
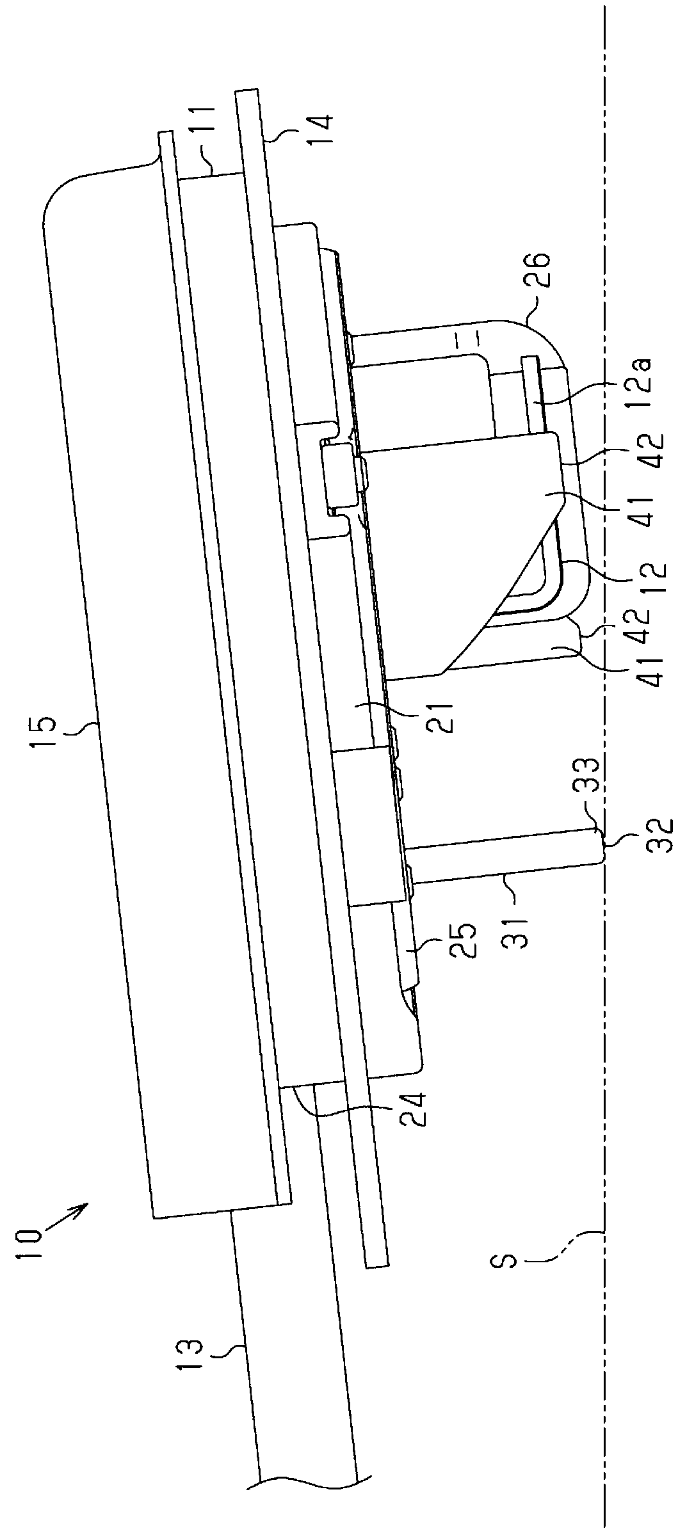
FIG. 5 is a side view showing a function in the connector of the embodiment.

As shown in FIG. 5, a main part of the connector 100 including the supporting member 11 and the terminals 12 may be, for example, placed on a table S or the like, such as after the unillustrated other end sides of the wires 13 are connected to a device such as the travel drive motor. At this time, the projections 33 of the first protection wall 31 contact the surface of the table S. In this way, the connector 10 is supported by the first protection wall 31. Here, the first protection wall 31 is located between the tip parts 12*a* of the terminals 12 and the pull-out portion 24 from which the wires 13 are pulled out. Due to the weight of the wires 13 and the connection of the other end sides of the wires 13 to the device such as the travel drive motor, the side of the pull-out portion 24 of the supporting member 11 is inclined toward the table S with a contact part of the first protection wall 31 with the table S as a fulcrum. In this way, the terminals 12 can be separated from the table S on the side of the opening 23 with respect to the first protection wall 31. As a result, the contact of the terminals 12 with the table S can be suppressed.

Further, the supporting member 11 of this embodiment is provided with the pair of second protection walls 41 in addition to the first protection wall 31. This enables the terminals 12 to be protected by the second protection walls 41 even if the side of the opening 23 is inclined toward the table S with the first protection wall 31 as a fulcrum.

In the connector 10, the fixing plate 14 and the supporting member 11 are assembled with the connection partner. As shown in FIG. 3, a predetermined part P of the connection partner is fit to the supporting member 11 with the connector 10 connected to the connection partner. Further, as shown in FIG. 4, the first protection wall 31 is separated from an edge part 23*a* of the opening 23 on the side of the pull-out portion 24 when viewed from the first direction D1. The part P partially enters a space between the edge part 23*a* of the opening 23 and the first protection wall 31. Note that the terminals 12 extend from this edge part 23*a* of the opening 23.

Here, if the second protection walls 41 are larger than the tip parts 12*a* of the terminals 12 in the second direction D1, it is thought to be possible to protect the terminals 12 only by the second protection walls 41 even in the absence of the first protection wall 31. However, in the case of such a configuration that the part P of the connection partner is fit as described above, if the second protection walls 41 are enlarged in the second direction D2, these interfere with the part P. Thus, there is a limit in enlarging the second protection walls 41 in the second direction D2. Accordingly, the terminals 12 can be protected by the first protection wall 31 while the connection to the part P of the connection partner is enabled by providing the first protection wall 31 located between the tip parts 12*a* of the terminals 12 and the pull-out portion 24 when viewed from the first direction D1.

Effects of this embodiment are described.

(1) The supporting member 11 includes the first protection wall 31 between the tip parts 12*a* of the terminals 12 and the pull-out portion 24. In this way, a center of gravity of the connector 10 can be set on the side of the wires 13 with respect to the first protection wall 31 due to the weight of the wires 13. Thus, the terminals 12 can be lifted from the table S with the first protection wall 31 as a fulcrum. Therefore, the terminals 12 can be protected by the first protection wall 31.

(2) The plurality of terminals 12 are provided side by side in the third direction D3 intersecting each of the first direction D1 and the second direction D2. According to this configuration, the dimension of the connector 10 is easily suppressed in the second direction D2, i.e. a direction of pulling out the wires 13, while the plurality of terminals 12 are provided. By suppressing the dimension of the connector 10 in the second direction D2, the center of gravity of the connector 10 is easily set on the side of the wires 13 when the connector 10 is placed on the table S or the like while being supported by the first protection wall 31. Therefore, the terminals 12 are easily lifted with the first protection wall 31 as a fulcrum, with the result that the terminals 12 can be more suitably protected.

(3) The first protection wall 31 is shaped to extend in the third direction D3 when viewed from the first direction D1. According to this configuration, the first protection wall 31 is shaped to extend in the arrangement direction of the terminals 12. In this way, the size of the first protection wall 31 can be ensured while the space between the opening 23 and the pull-out portion 24 in the supporting member 11 is effectively utilized.

(4) The first protection wall 31 includes the plurality of projections 33 arranged along the third direction D3 on the tip part 32 in the first direction D1. Thus, the dimensional control of the tip part 32 is easy. In this way, a dimensional error of the tip part 32 can be suppressed, wherefore the connector 10 can be stably supported by the first protection wall 31 when being placed on the table S or the like.

(5) The range A1 where the first protection wall 31 is provided is smaller in the third direction D3 than the range A2 where the plurality of terminals 12 are provided. According to this configuration, the plurality of terminals 12 can be protected by the first protection wall 31 while the first protection wall 31 is reduced in size in the third direction D3.

(6) The supporting member 11 includes the pair of second protection walls 41 respectively extending along the first direction D1. The pair of second protection walls 41 are arranged on both sides of the opening 23 in the third direction D3 intersecting each of the first and second directions D1, D2. According to this configuration, the terminals 12 can be protected by the pair of second protection walls 41 in addition to the first protection wall 31. As a result, the terminals 12 can be more reliably protected.

(7) The second protection walls 41 are shaped to extend in the second direction D2 when viewed from the first direction D1. According to this configuration, the connector 10 can be reduced in size in the third direction D3 as compared to the case where the second protection walls 41 extend in the third direction D3 when viewed from the first direction D1.

(8) In the first direction D1, the tip part 32 of the first protection wall 31 projects more than the tip parts 12*a* of the terminals 12. According to this configuration, the terminals 12 are easily lifted with the first protection walls 31 as a fulcrum when the connector 10 is placed on the table S or the like while being supported by the first protection wall 31. As a result, the terminals 12 can be more suitably protected.

(9) The first protection wall 31 is provided at the position away from the edge part 23*a* of the opening 23. In this way, the space into which the part P of the connection partner enters can be ensured between the edge part 23*a* of the opening 23 and the first protection wall 31.

This embodiment can be modified and carried out as follows. This embodiment and the following modifications can be carried in combination without technically contradicting each other.

- A plurality of the first protection walls 31 may be provided side by side in the third direction D3. In this case, the plurality of first protection walls 31 are arranged in the range A1.
- The tip part 32 of the first protection wall 31 and the tip parts 12*a* of the terminals 12 may be at the same position in the first direction D1. Further, the tip parts 12*a* of the terminals 12 may project more than the tip part 32 of the first protection wall 31 in the first direction D1. Even in these configurations, the terminals 12 can be lifted from the table S with the first protection wall 31 as a fulcrum.
- The plurality of projections 33 may be omitted in the first protection wall 31 of the above embodiment.

The range A1 where the first protection wall 31 is provided may be set larger in the third direction D3 than the range A2 where the plurality of terminals 12 are provided.

Although the first protection wall 31 is shaped to extend in the third direction D3 when viewed from the first direction D1 in the above embodiment, there is no limitation to this and the first protection wall 31 may be shaped to extend in a direction oblique to the third direction D3 when viewed from the first direction D1.

Although the second protection walls 41 are shaped to extend in the second direction D2 when viewed from the first direction D1 in the above embodiment, there is no limitation to this and the second protection walls 41 may be shaped to extend in a direction oblique to the second direction D2 when viewed from the first direction D1. Further, the pair of second protection walls 41 may be omitted in the supporting member 11 of the above embodiment.

Although the supporting member 11 of the above embodiment includes the body portion 21 and the cover portion 22, there is no limitation to this and the cover portion 22 may be omitted. In this case, the opening 23 may not necessarily be in the form of a hole penetrating through the body portion 21. That is, the body portion 21 may integrally include a part for closing the end part of the opening 23 on the side opposite to the side facing the connection partner.

The number and arrangement of the terminals 12 are not limited to those in the above embodiment and can be changed as appropriate according to the configuration of the connector 10. For example, the plurality of terminals 12 may be arranged in the second direction D2. Further, for example, the single terminal 12 may be set.

Although the direction of pulling out the wires 13 from the supporting member 11, i.e. the second direction D2, is orthogonal to an opening direction of the opening 23, i.e. the first direction D1 in the above embodiment, there is no particular limitation to this. That is, the second direction D2 may not be orthogonal to the first direction D1 as long as being a direction intersecting the first direction D1.

Although the arrangement direction of the terminals 12, i.e. the third direction D3, is orthogonal to each of the first and second directions D1, D2 in the above embodiment, there is no particular limitation to this. That is, the third direction D3 may not be orthogonal to each of the first and second directions D1, D2 as long as being a direction intersecting each of the first and second directions D1, D2.

The embodiment disclosed this time should be considered illustrative in all aspects, rather than restrictive. The scope of the present invention is represented not by the above meaning, but by claims and is intended to include all changes in the scope of claims and in the meaning and scope of equivalents.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:

a support including an opening open in a first direction;

a plurality of terminals supported by the support; and a wire connected to each terminal, wherein:

the terminals extend inwardly of the opening from an inner surface of the opening and extends to outside of the support through the opening, the support includes:

a pull-out portion, the wire being pulled out from the pull-out portion away from the opening along a second direction intersecting the first direction;

a first protection wall extending along the first direction between tips of the terminals and the pull-out portion; and a pair of second protection walls respectively extending along the first direction and arranged on both sides of the opening in a third direction intersecting each of the first and second directions, a tip of the first protection wall and tips of the pair of second protection walls project more than the tips of the entirety of the terminals in the first direction.

2. The connector of claim 1, wherein the plurality of the terminals are provided side by side in a third direction intersecting each of the first and second directions.

3. The connector of claim 2, wherein the first protection wall is shaped to extend in the third direction when viewed from the first direction.

4. The connector of claim 3, wherein the first protection wall includes a plurality of projections arranged along the third direction on the tip in the first direction.

5. The connector of claim 2, wherein a range where the first protection wall is provided is smaller in the third direction than a range where the plurality of terminals are provided.

6. The connector of claim 1, wherein the second protection walls are shaped to extend in the second direction when viewed from the first direction.

7. The connector of claim 1, wherein the support further includes a body portion defining the opening, and the body portion and at least one of the first protection wall and the second protection walls are in an integral structure.

* * * * *